(12) United States Patent
Kuroiwa

(10) Patent No.: US 10,070,018 B2
(45) Date of Patent: Sep. 4, 2018

(54) DEVICE FOR VERTICAL AND HORIZONTAL SYNCHRONIZATION IN DISPLAY SYSTEM

(71) Applicant: Synaptics Japan GK, Tokyo (JP)

(72) Inventor: Tsuyoshi Kuroiwa, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 0 days.

(21) Appl. No.: 15/679,930

(22) Filed: Aug. 17, 2017

(65) Prior Publication Data

US 2018/0054550 A1    Feb. 22, 2018

(30) Foreign Application Priority Data

Aug. 19, 2016 (JP) .................... 2016-161390

(51) Int. Cl.
| | | |
|---|---|---|
| H04N 5/073 | (2006.01) | |
| H04N 5/08 | (2006.01) | |
| H04N 7/083 | (2006.01) | |
| G09G 3/3208 | (2016.01) | |
| H04N 5/05 | (2006.01) | |
| H04N 5/12 | (2006.01) | |

(52) U.S. Cl.
CPC ............. *H04N 5/073* (2013.01); *H04N 5/08* (2013.01); *H04N 7/083* (2013.01); *G09G 3/3208* (2013.01); *H04N 5/05* (2013.01); *H04N 5/126* (2013.01)

(58) Field of Classification Search
CPC ............................................ G09G 2340/0442
USPC ................. 348/500, 511–514, 521, 525, 547
See application file for complete search history.

(56) References Cited

U.S. PATENT DOCUMENTS

| | | | | |
|---|---|---|---|---|
| 5,027,212 A * | 6/1991 | Marlton | .................... | G09G 1/16 |
| | | | | 345/213 |
| 5,111,190 A * | 5/1992 | Zenda | .................... | G06F 3/1431 |
| | | | | 345/3.3 |
| 5,227,882 A * | 7/1993 | Kato | ..................... | G09G 3/3611 |
| | | | | 348/441 |
| 5,396,258 A * | 3/1995 | Zenda | .................... | G06F 3/1431 |
| | | | | 345/204 |
| 5,592,187 A * | 1/1997 | Zenda | .................... | G06F 3/1431 |
| | | | | 345/213 |
| 5,790,096 A * | 8/1998 | Hill, Jr. | .................. | G09G 5/005 |
| | | | | 345/600 |
| 6,005,618 A * | 12/1999 | Fukui | ................... | H04N 5/2353 |
| | | | | 348/222.1 |
| 6,181,300 B1* | 1/2001 | Poon | ........................ | G09G 5/12 |
| | | | | 345/213 |
| 6,198,468 B1* | 3/2001 | Cho | .................... | H04N 5/44504 |
| | | | | 248/917 |

(Continued)

FOREIGN PATENT DOCUMENTS

JP    2014-115391 A    6/2014

*Primary Examiner* — Paulos M Natnael
(74) *Attorney, Agent, or Firm* — Patterson + Sheridan, LLP

(57) ABSTRACT

A display driver for a display device including a sync extraction circuit configured to generate a vertical sync source signal in response to a vertical sync period start instruction indicating a start of a vertical sync period, a timing generator configured to generate an internal vertical sync signal in response to the vertical sync source signal; and a drive circuit configured to drive the display panel in synchronization with the internal vertical sync signal.

16 Claims, 9 Drawing Sheets

(56) References Cited

U.S. PATENT DOCUMENTS

| | | | | |
|---|---|---|---|---|
| 6,603,512 B2* | 8/2003 | Shimokawa | ......... | H04N 5/2353 348/296 |
| 6,816,131 B2* | 11/2004 | Narui | ..................... | G09G 1/167 345/3.2 |
| 7,482,995 B2* | 1/2009 | Nakamura | ............ | G06F 3/1431 345/1.1 |
| 8,643,782 B2* | 2/2014 | Hayashi | ................... | H04N 5/06 348/521 |
| 2002/0041335 A1* | 4/2002 | Taraci | .................... | G09G 5/006 348/511 |
| 2003/0090582 A1* | 5/2003 | Shimokawa | ......... | H04N 5/2353 348/297 |
| 2005/0201537 A1* | 9/2005 | Honda | ................ | G06F 13/4291 379/100.17 |
| 2007/0001980 A1* | 1/2007 | Bae | ..................... | G09G 3/3611 345/98 |
| 2014/0362042 A1* | 12/2014 | Noguchi | .............. | G06F 3/0412 345/174 |

* cited by examiner

Prior Art

DEVICE FOR VERTICAL AND HORIZONTAL SYNCHRONIZATION IN DISPLAY SYSTEM

CROSS REFERENCE

This application claims priority of Japanese Patent Application No. 2016-161390, filed on Aug. 19, 2016, the disclosure of which is incorporated herein by reference.

TECHNICAL FIELD

The present invention relates to a display driver and a display device, more particularly, to a technique for achieving synchronization (for example, vertical synchronization and horizontal synchronization) in a display driver and a display device.

BACKGROUND ART

Generally, a display device (such as a liquid crystal display device and an OLED (organic light emitting diode) display device) requires establishment of synchronization, more particularly, vertical and horizontal synchronizations. The most traditional method for establishing vertical and horizontal synchronizations is to supply a vertical sync (synchronization) signal and a horizontal sync signal. In this architecture, the start of each vertical sync period is indicated by the vertical sync signal and the start of each horizontal sync period is indicated by the horizontal sync signal. In a panel display device, for example, vertical and horizontal synchronizations are achieved by supplying a vertical sync signal and a horizontal sync signal to a display driver which drives a display panel and operating the display driver in synchronization with the vertical sync signal and the horizontal sync signal.

Recent display systems often use an architecture in which specific packets are transmitted to the display driver to indicate starts of vertical sync periods and horizontal sync periods. For example, MIPI DSI (mobile industry processor interface display serial interface) is a typical specification based on such architecture. In the MIPI DSI specification, a Vsync packet is defined as a packet which indicates the start of each vertical sync period and an Hsync packet is defined as a packet which indicates the start of each horizontal sync period. In the present application, a packet which indicates the start of a vertical sync period may be referred to as vertical sync packet and a packet which indicates the start of a horizontal sync period may be referred to as horizontal sync packet. Most typically, an internal vertical sync signal is generated in response to vertical sync packets in the display driver, and an internal horizontal sync signal is generated in response to horizontal sync packets. Circuits integrated in the display driver operate in synchronization with the internal vertical and horizontal sync signals thus generated.

This architecture advantageously reduces the number of signal lines. The configuration in which a vertical and horizontal sync signals are supplied to a display driver, requires signal lines dedicated to supply the vertical and horizontal sync signals, undesirably increasing the number of signal lines. Transmitting vertical and horizontal sync packets indicating the start timing of the vertical and horizontal sync periods by using a data interface in place of the vertical and horizontal sync signals eliminates the need of providing dedicated signal lines, effectively reducing the number of signal lines.

One problem which may occur in synchronization establishment in a display drive is that the synchronization may not be achieved when noise is applied to signal lines related to the synchronization establishment.

For example, FIG. 1 is a timing chart illustrating an example of the operation in which a horizontal sync packet is transmitted over LANE #i in a display system which uses an architecture in which horizontal sync packets are used to establish horizontal synchronization, more specifically, a display system which uses a serial interface supporting the MIPI DSI specification.

A horizontal sync packet is transmitted to the display driver when a horizontal sync period is started. In a typical operation of the display system, when a horizontal sync packet is supplied to the display driver, the internal horizontal sync signal is asserted in synchronization with the horizontal sync packet in the display driver. Circuits integrated in the display driver perform predetermined operations in response to the assertion of the internal horizontal sync signal.

Nevertheless, when the display driver unsuccessfully receives a horizontal sync packet due to an application of high voltage noise to LANE #i, for example, the internal horizontal sync signal is not asserted at appropriate timing and this results in failure of horizontal synchronization. The similar goes for a vertical sync packet. When the display driver unsuccessfully receives a vertical sync packet, this results in failure of vertical synchronization.

When vertical and/or horizontal synchronization is not achieved due to unsuccessful reception of a vertical and/or horizontal sync packet, this may cause disturbance of the image displayed on the display panel. FIG. 2 illustrates one example of the displayed image when vertical and horizontal synchronizations are not successfully established. When an image data packet is not successfully received, the image disturbance is limited to pixels corresponding to the image data packet; however, failure of reception of a vertical and/or horizontal sync packet may undesirably influence on the entire of the displayed image.

The similar goes for an architecture which establishes vertical and horizontal synchronizations by using a vertical sync signal and a horizontal sync signal. When noise is applied to signal lines over which the vertical and horizontal sync signals are transmitted, this may result in failure of vertical and horizontal synchronizations.

As understood from the above, there is a need for suppressing disturbance of the displayed image caused by unsuccessful synchronization establishment.

SUMMARY

Therefore, one objective of the present disclosure is to suppress disturbance of the displayed image caused by unsuccessful synchronization establishment. A person skilled in the art would understand other objectives and new features of the present disclosure from the following disclosure.

In one embodiment, a display driver includes a a sync extraction circuit, a timing generator and a drive circuit. The sync extraction circuit is configured to generate a vertical sync source signal in response to a vertical sync period start instruction indicating a start of a vertical sync period where the vertical sync period start instruction is supplied external from the display driver. The timing generator is configured to generate an internal vertical sync signal in response to the vertical sync source signal. The drive circuit is configured to drive a display panel in synchronization with the internal vertical sync signal. The timing generator circuit is further configured to assert the internal vertical sync signal in response to an assertion of the vertical sync source signal. The sync extraction circuit is further configured to assert the vertical sync source signal when detecting the vertical sync period start instruction. Further, the sync extraction circuit is also configured to assert the vertical sync source signal when a predetermined period of time has passed after a previous assertion of the vertical sync source signal.

In another embodiment, a display driver includes a sync extraction circuit, a timing generator and a drive circuit. The sync extraction circuit is configured to generate a horizontal sync source signal in response to a horizontal sync period start instruction indicating a start of a horizontal sync period, the horizontal sync period start instruction is supplied external from outside of the display drive. The timing generator configured to generate an internal horizontal sync signal in response to the horizontal sync source signal. The drive circuit configured to drive the display panel in synchronization with the internal horizontal sync signal. The timing generator circuit is further configured to assert the internal horizontal sync signal in response to an assertion of the horizontal sync source signal. The sync extraction circuit is further configured to assert the horizontal sync source signal when detecting the horizontal sync period start instruction. Further, the sync extraction circuit is also configured to assert the horizontal sync source signal when a predetermined period of time has passed after a previous assertion of the horizontal sync source signal.

In various embodiments, the display driver may be used in a display device.

The present disclosure provides a technique for suppressing disturbance of the displayed image caused by unsuccessful synchronization establishment.

DETAILED DESCRIPTION

Figure 1:
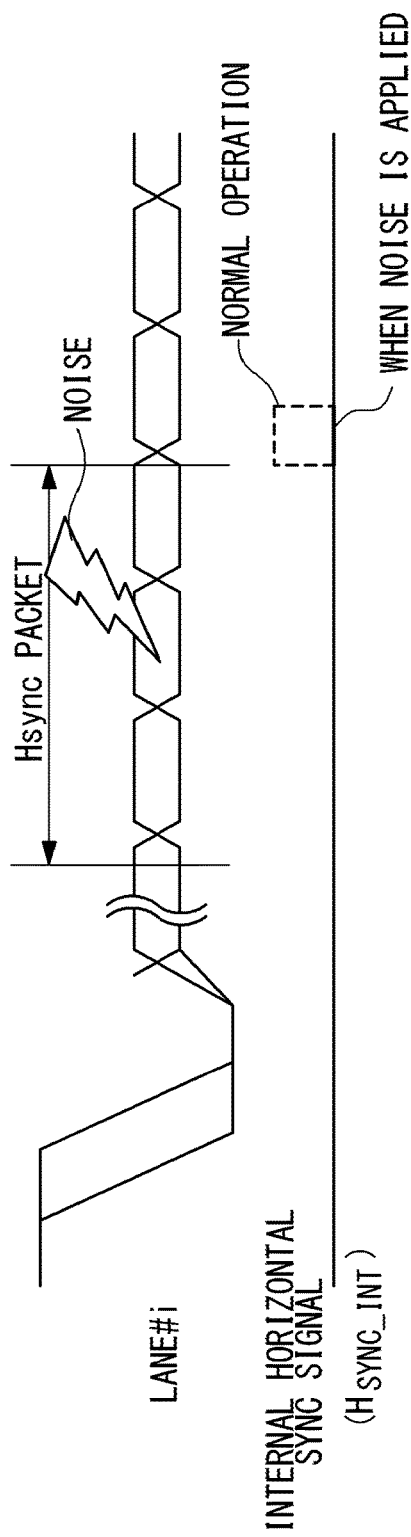
FIG. 1 is a timing chart illustrating one example of the operation for transmitting a horizontal sync packet in a display system which uses a serial interface supporting the MIPI DSI specification.
Figure 2:
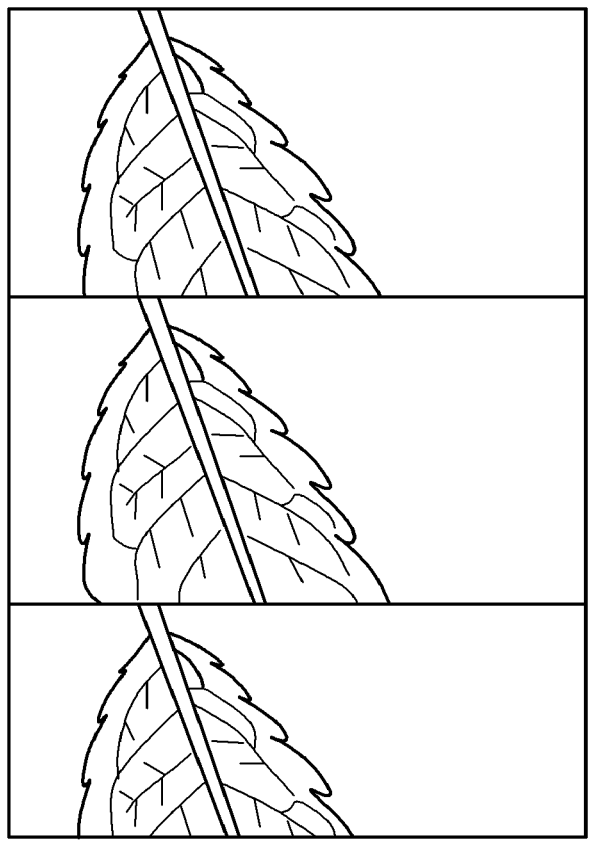
FIG. 2 illustrates one example of a displayed image when vertical and horizontal synchronizations are not successfully established.

In the following, one or more embodiments of the disclosure will be described with reference to the attached drawings. It should be noted that same or similar components may be denoted by same or corresponding reference numerals.

Figure 3:
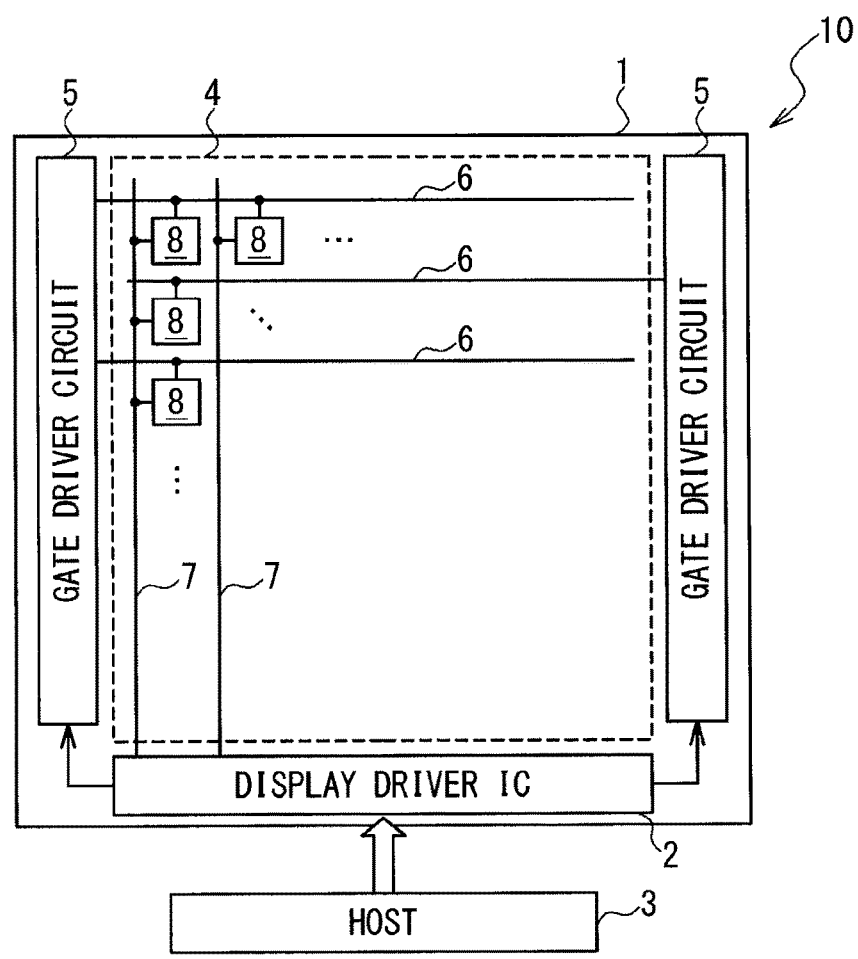
FIG. 3 is a block diagram schematically illustrating an exemplary configuration of a display device according to one or more embodiments of the disclosure.

FIG. 3 is a block diagram schematically illustrating an exemplary configuration of a display device 10 in one embodiment. The display device 10, which is configured as a liquid crystal display device, includes an LCD (liquid crystal display) panel 1 and a display driver IC 2. The display device 10 is configured to receive image data and control data from a host 3 and display images on the LCD panel 1 in response to the received image data and control data.

The LCD panel 1 includes a display area 4 and gate driver circuits 5. Arranged in the display area 4 are a plurality of gate lines 6, a plurality of source lines 7 and a plurality of pixels 8. The pixels 8 are arrayed in rows and columns, and each pixel 8 is disposed at an intersection of the corresponding gate line 6 and source line 7. The gate driver circuits 5 drive the gate lines 6 in response to control signals received from the display driver IC 2. In one embodiment, a pair of gate driver circuits 5 are disposed on the right and left of the display area 4. The gate driver circuits 5 are integrated in the LCD panel 1 by using a CoG (circuit-on-glass) technology.

The display driver IC 2 drives the source lines 7 of the LCD panel 1 in response to the image data and control data received from the host 3. Additionally, the display driver IC 2 controls the gate driver circuits 5 by supplying the gate control signals to the gate driver circuits 5.

Figure 4:
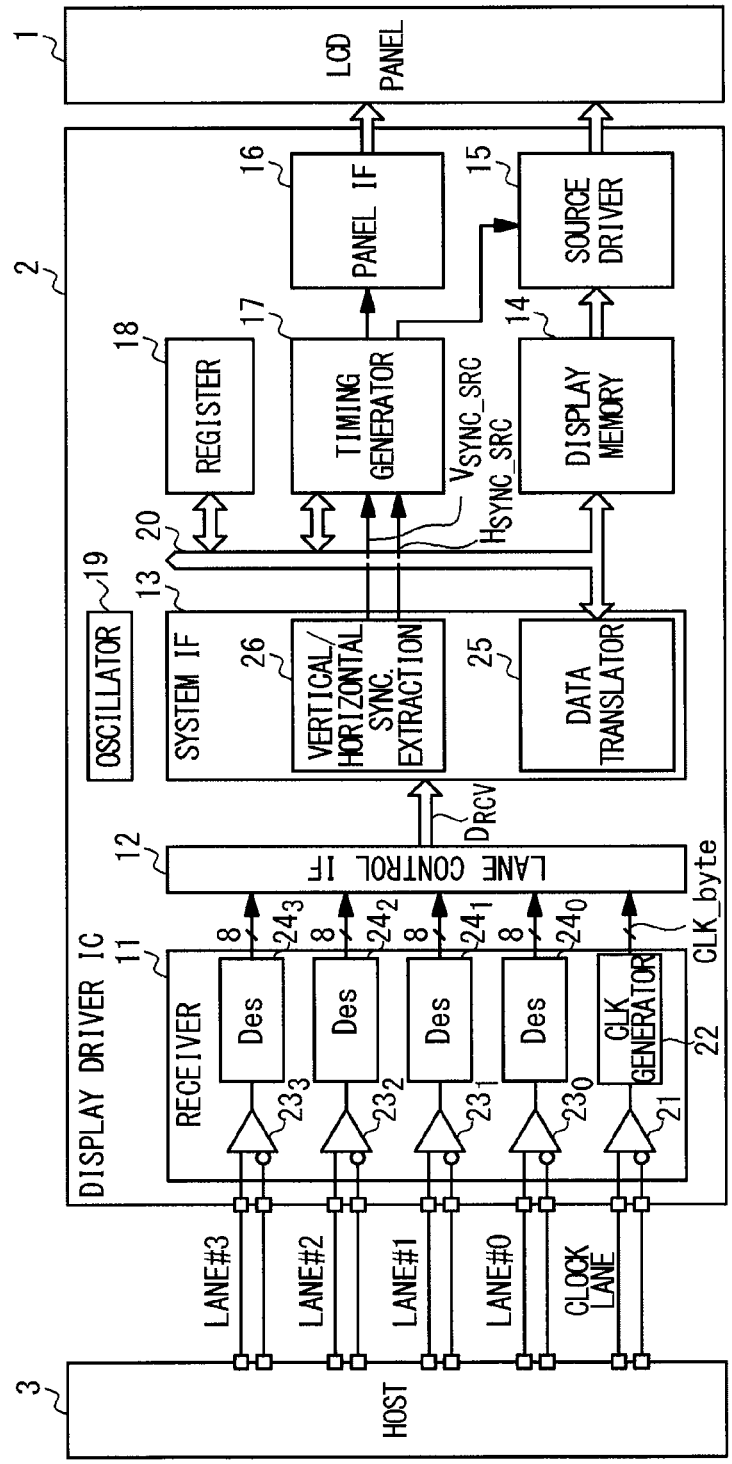
FIG. 4 is a block diagram schematically illustrating an exemplary configuration of a display driver IC according to one or more embodiments of the disclosure.

FIG. 4 is a block diagram schematically illustrating an exemplary configuration of the display driver IC 2 according to one or more embodiments of the disclosure. In one embodiment, communications between the display driver IC 2 and the host 3 are achieved by using a serial interface which supports the MIPI DSI specification. More specifically, the display driver IC 2 and the host 3 are connected with a clock lane and four data lanes: lanes #0 to #3 in one embodiment. The clock lane is used to supply a differential clock signal from the host 3 to the display driver IC 2 and lanes #0 to #3 are each used to supply a differential data signal from the host 3 to the display driver IC 2.

Figure 5:
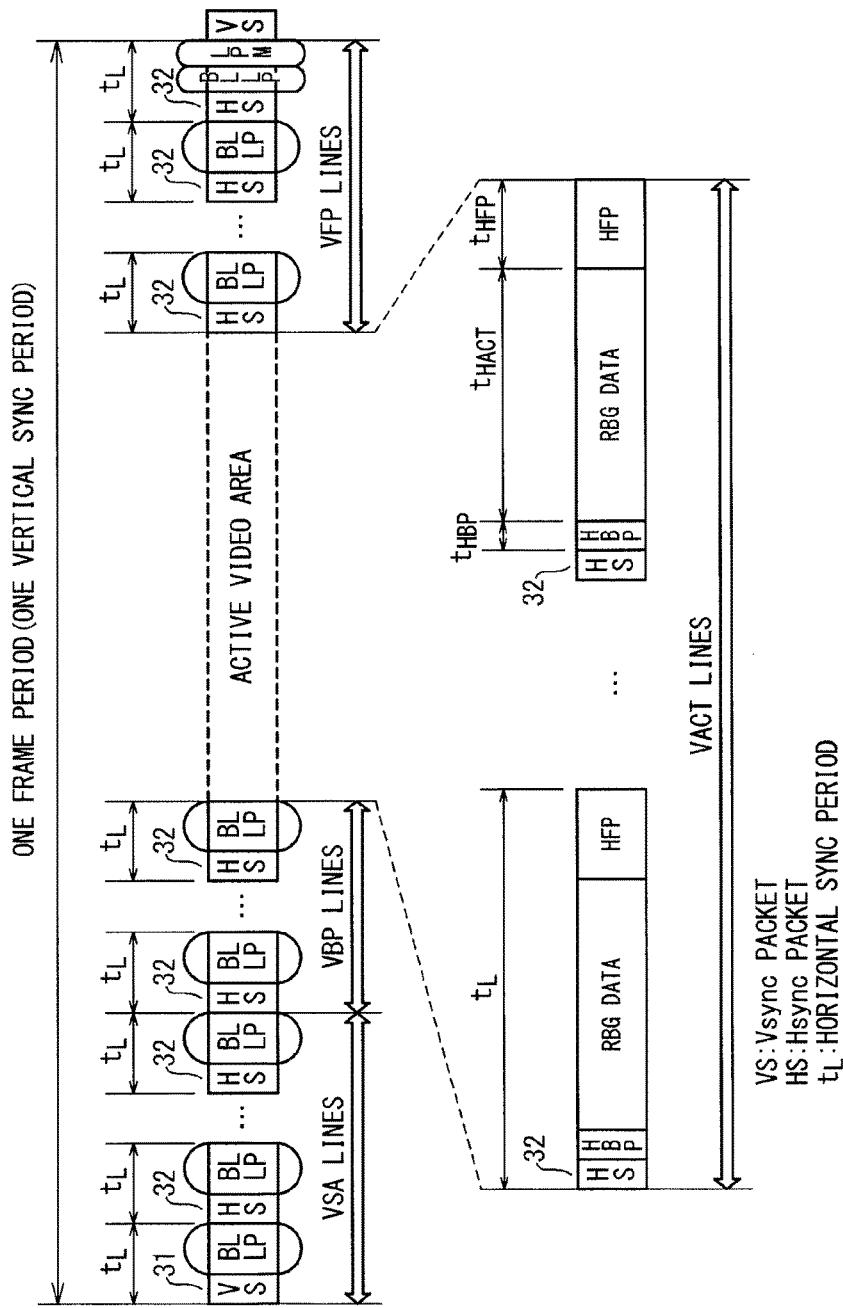
FIG. 5 is a diagram illustrating an exemplary format of a data stream in communications from a host to the display driver IC according to one or more embodiments of the disclosure.

FIG. 5 is a diagram illustrating an exemplary format of a data stream used in communications from the host 3 to the display driver IC 2. Each frame period (vertical sync period) includes VSA (vertical sync active) lines, VBP (vertical back porch) lines, VACT (video active) lines and VFP (vertical front porch) lines. A vertical sync packet 31 (that is, a Vsync packet) is transmitted from the host 3 to the display driver IC 2, when each frame period is started, and a horizontal sync packet 32 (that is, an Hsync packet) is transmitted from the host 3 to the display driver IC 2 when each line (each horizontal sync period) is started. In one embodiment, a vertical sync packet 31 is used as a vertical sync period start instruction which indicates the start of a vertical sync period, and a horizontal sync packet 32 is used as a horizontal sync period start instruction which indicates the start of a line, that is, a horizontal sync period.

Referring back to FIG. 4, the display driver IC 2 includes a receiver circuit 11, a lane control interface circuit 12, a system interface circuit 13, a display memory 14, a source driver circuit 15, a panel interface circuit 16, a timing generator circuit 17, a register circuit 18 and an oscillator circuit 19.

The receiver circuit 11 includes a receiver 21, a clock generator circuit 22, receivers $23_0$ to $23_3$ and deserializers $24_0$ to $24_3$. The receiver 21 converts the differential clock signal transmitted from the host 3 over the clock lane into a single end clock signal. The clock generator circuit 22 generates a dot clock signal (not illustrated) used in the receiver circuit 11 and a byte clock signal CLK_byte used in the lane control interface circuit 12.

The receivers $23_0$ to $23_3$ respectively convert differential data signals transmitted from the host 3 over lanes #0 to #3 into single end signals. The deserializers $24_0$ to $24_3$ operate in synchronization with the dot clock signal and deserialize the single end signals received from the receivers $23_0$ to $23_3$, respectively. In one embodiment, the deserializers $24_0$ to $24_3$ output the deserialized data with a data width of eight bits.

The lane control interface circuit 12 receives the deserialized data from the deserializers $24_0$ to $24_3$ in synchronization with the byte clock signal CLK_byte and generates a received data train $D_{RCV}$ by synthesizing the received data. The received data train $D_{RCV}$ is supplied to the system interface circuit 13.

The system interface circuit 13 identifies the contents of data included in the received data train $D_{RCV}$ by using a data translator 25 and performs various data processing on various data included in the received data train $D_{RCV}$, which include, for example, image data (data indicating the grayscale levels of the respective pixels of the LCD panel 1), commands and parameters used to control the display driver IC 2, depending on the data types thereof. For example, the system interface circuit 13 forwards image data included in the received data train $D_{RCV}$ to the display memory 14 and forwards commands and parameters used to control the display driver IC 2 to the timing generator circuit 17 and the register circuit 18 via a bus 20.

The display memory 14 temporarily stores the image data received from the system interface circuit 13 and forwards the image data to the source driver circuit 15.

The source driver circuit 15 drives the source lines 7 of the LCD panel 1 in response to the image data received from the display memory 14.

The panel interface circuit 16 generates the gate control signals supplied to the gate driver circuits 5 of the LCD panel 1.

The timing generator circuit 17 controls operation timing of the circuits included in the display driver IC 2 in response to the commands and parameters received from the system interface circuit 13 and the register circuit 18. More specifically, the timing generator circuit 17 generates an internal vertical sync signal and an internal horizontal sync signal, which are both used in the display driver IC 2. The above-described source driver circuit 15 and panel interface circuit 16 operate in synchronization with the generated internal vertical sync signal and internal horizontal sync signal. In other words, the source driver circuit 15 drives the source lines 7 of the LCD panel 1 in synchronization with the internal vertical sync signal and internal horizontal sync signal and the panel interface circuit 16 generates the gate control signals in synchronization with the internal vertical sync signal and internal horizontal sync signal.

The register circuit 18 holds commands and parameters used to control the display driver IC 2.

The oscillator circuit 19 generates a clock signal used in the display driver IC 2.

In the display driver IC 2 according to one or more embodiments of the disclosure, the internal vertical sync signal and internal horizontal sync signal used in the display driver IC 2 are generated in synchronization with vertical sync period start instructions and horizontal sync period start instructions received from the host 3, more specifically, in synchronization with vertical sync packets and horizontal sync packets received from the host 3. The vertical sync packets and horizontal sync packets are transmitted from the host to the display driver IC 2 over a selected one of lanes #0 to #3. When a vertical sync packet is successfully received by the display driver IC 2, the internal vertical sync signal is asserted by the timing generator circuit 17. Similarly, when a horizontal sync packet is successfully received by the display driver IC 2, the internal horizontal sync signal is asserted by the timing generator circuit 17.

To perform these operations, the system interface circuit 13 includes a vertical/horizontal sync extraction circuit 26 according to one or more embodiments of the disclosure. The vertical/horizontal sync extraction circuit 26 has the function of detecting vertical sync period start instructions and horizontal sync period start instructions transmitted from the host 3; in the present embodiment, the vertical/horizontal sync extraction circuit 26 has the function of detecting vertical sync packets and horizontal sync packets included in the received data train $D_{RCV}$ to generate a vertical sync source signal $V_{SYNC\_SRC}$ and a horizontal sync source signal $H_{SYNC\_SRC}$. The vertical sync source signal $V_{SYNC\_SRC}$ and the horizontal sync source signal $H_{SYNC\_SRC}$ are used to generate the internal vertical sync signal and the internal horizontal sync signal, respectively, in the timing generator circuit 17. When detecting a vertical sync period start instruction, that is, detecting a vertical sync packet in the received data train $D_{RCV}$, the vertical/horizontal sync extraction circuit 26 asserts the vertical sync source signal $V_{SYNC\_SRC}$. Similarly, when detecting a horizontal sync period start instruction, that is, detecting a horizontal sync packet in the received data train $D_{RCV}$, the vertical/horizontal sync extraction circuit 26 asserts the horizontal sync source signal $H_{SYNC\_SRC}$. The timing generator circuit 17 asserts the internal vertical sync signal when the vertical sync source signal $V_{SYNC\_SRC}$ is asserted, and asserts the internal horizontal sync signal when the horizontal sync source signal $H_{SYNC\_SRC}$ is asserted.

In one embodiment, the vertical/horizontal sync extraction circuit 26 is configured to assert the vertical sync source signal $V_{SYNC\_SRC}$ when a predetermined period of time has passed after the previous assertion of the vertical sync source signal $V_{SYNC\_SRC}$, even if the display driver IC 2 does not successfully receive a vertical sync packet in a period in which a vertical sync packet is expected to be transmitted to the display driver IC 2. Similarly, the vertical/horizontal sync extraction circuit 26 is configured to assert the horizontal sync source signal $H_{SYNC\_SRC}$ when a predetermined period of time has passed after the previous assertion of the horizontal sync source signal $H_{SYNC\_SRC}$, even if the display driver IC 2 does not successfully receive a horizontal sync packet in a period in which a horizontal sync packet is expected to be transmitted to the display driver IC 2.

In various embodiments, assert the vertical sync source signal may be asserted when a predetermined period of time has passed after a previous assertion of the vertical sync source signal, even if not the vertical sync period start instruction has not been detected.

In one or more embodiments, the horizontal sync source signal may be asserted when a predetermined period of time has passed after a previous assertion of the horizontal sync source signal even if the horizontal sync period start instruction has not been detected.

These operations of the vertical/horizontal sync extraction circuit 26 effectively suppresses disturbance of the displayed image even when the display driver IC 2 temporarily fails to successfully receive a vertical sync packet or a horizontal sync packet. In the following, a description is given of details of the configuration and operation of the vertical/horizontal sync extraction circuit 26.

Figure 6:
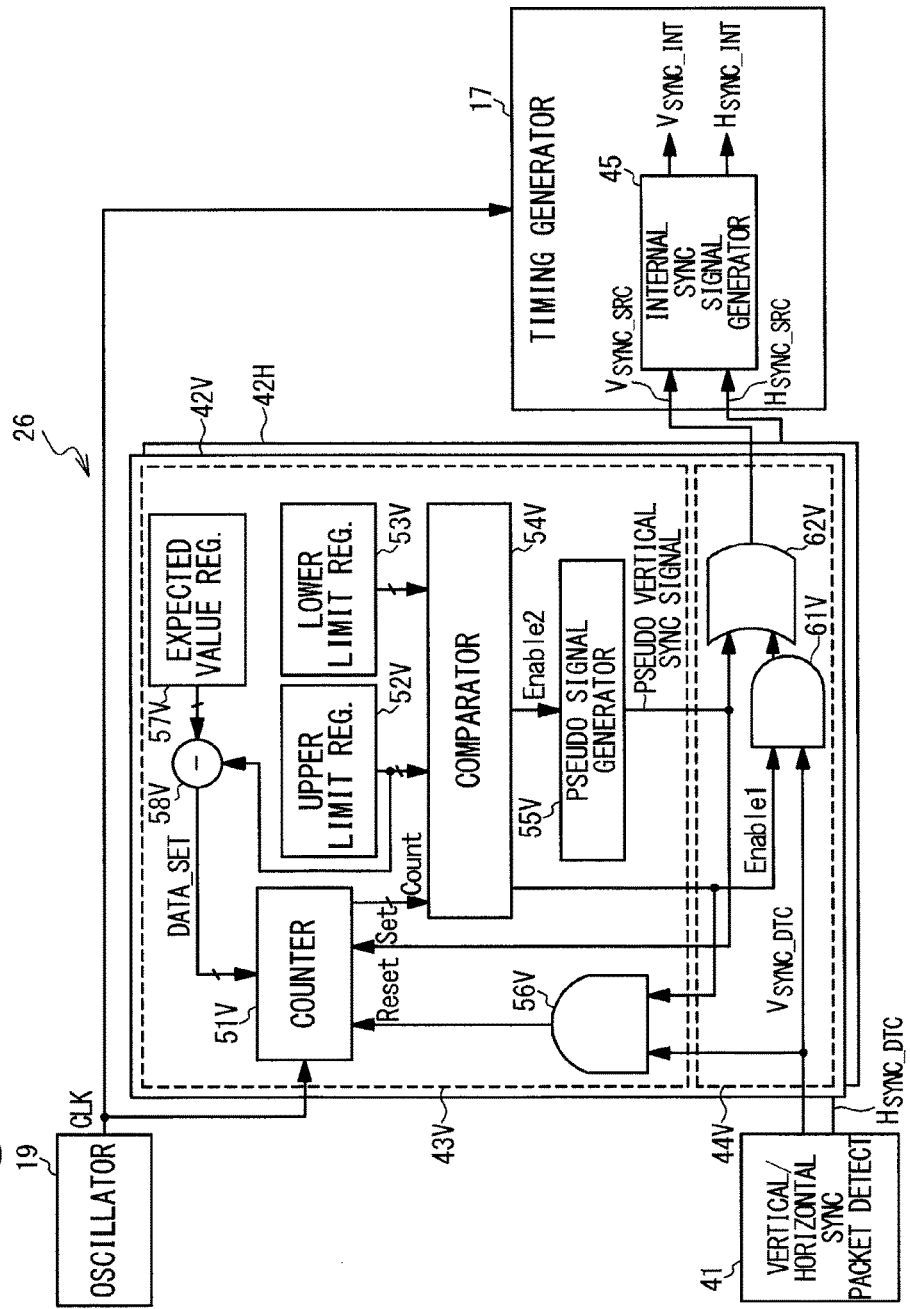
FIG. 6 is a block diagram illustrating an exemplary configuration of a vertical sync source signal generator section in a vertical/horizontal sync extraction circuit according to one or more embodiments of the disclosure.
Figure 7:
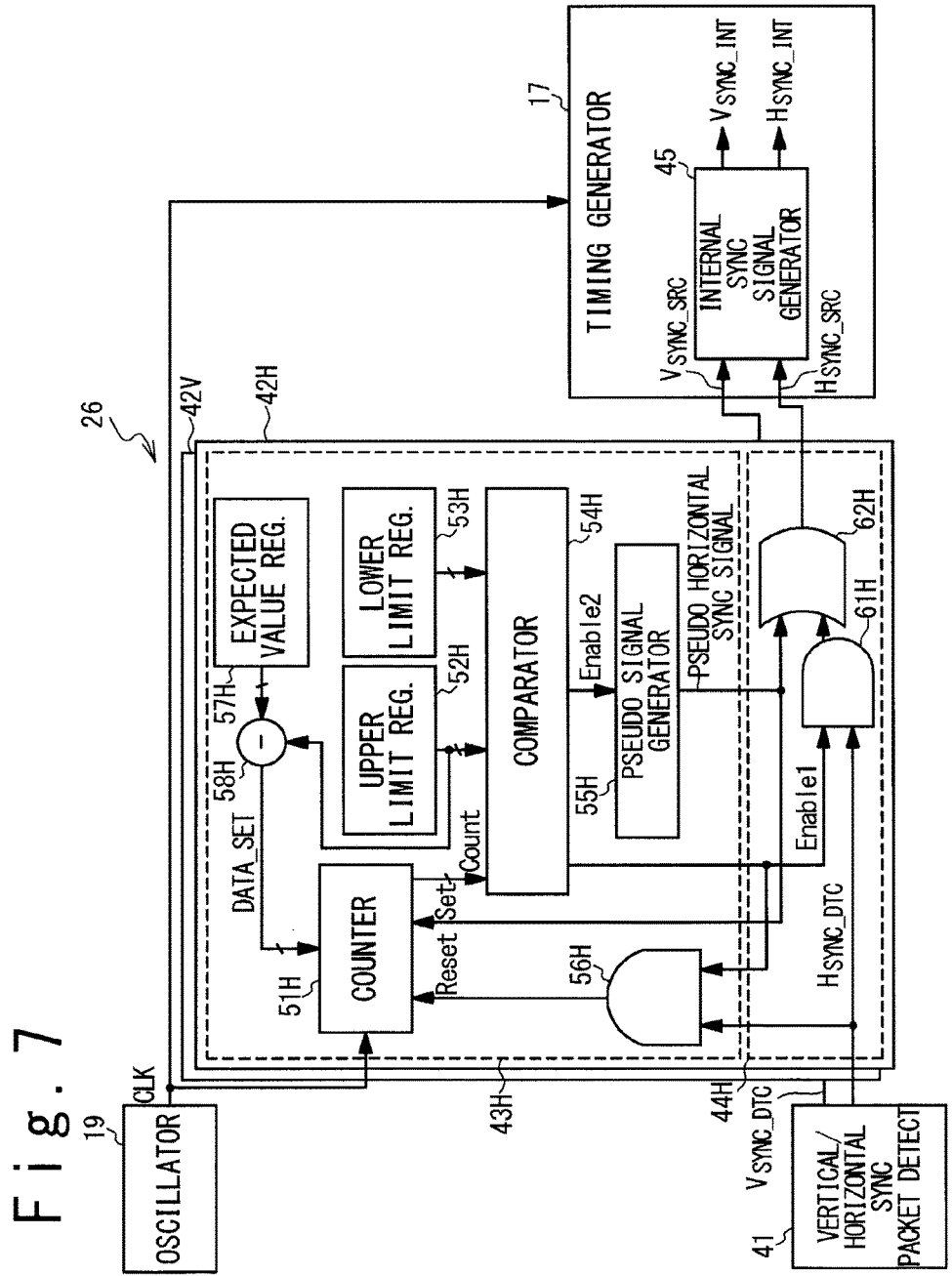
FIG. 7 is a block diagram illustrating an exemplary configuration of a horizontal sync source signal generator section in the vertical/horizontal sync extraction circuit according to one or more embodiments of the disclosure.

FIGS. 6 and 7 are block diagrams illustrating one example of the configuration of the vertical/horizontal sync extraction circuit 26. The vertical/horizontal sync extraction circuit 26 includes a vertical/horizontal sync packet detect section 41, a vertical sync source signal generator section 42V and a horizontal sync source signal generator section 42H. It should be noted that the configuration of the vertical sync source signal generator section 42V is illustrated in FIG. 6, and the configuration of the horizontal sync source signal generator section 42H is illustrated in FIG. 7.

The vertical/horizontal sync packet detect section 41 is configured to detect vertical sync packets and horizontal sync packets and generate a vertical sync packet detect signal $V_{SYNC\_DTC}$ and a horizontal sync packet detect signal $H_{SYNC\_DTC}$ in accordance with the detection result. More specifically, when detecting a vertical sync packet in the received data train $D_{RCV}$, the vertical/horizontal sync packet detect section 41 asserts the vertical sync packet detect signal $V_{SYNC\_DTC}$. Similarly, when detecting a horizontal sync packet in the received data train $D_{RCV}$, the vertical/horizontal sync packet detect section 41 asserts the horizontal sync packet detect signal $H_{SYNC\_DTC}$.

The vertical sync source signal generator section 42V generates the vertical sync source signal $V_{SYNC\_SRC}$ from the vertical sync packet detect signal $V_{SYNC\_DTC}$. More specifically, as illustrated in FIG. 6, the vertical sync source signal generator section 42V includes a pseudo vertical sync signal generator section 43V and a logic circuit section 44V.

The pseudo vertical sync signal generator section 43V includes a counter 51V and generates a pseudo vertical sync signal in response to the count value Count held by the counter 51V. In detail, the pseudo vertical sync signal generator section 43V includes, in addition to the counter 51V, an upper limit register 52V, a lower limit register 53V, a comparator 54V, a pseudo signal generator 55V, an AND gate 56V, an expected value register 57V, and a subtracter 58V.

The counter 51 receives the clock signal CLK from the oscillator circuit 19 and performs a counting operation in synchronization with the received clock signal CLK. In one embodiment, the counter 51V counts up the count value Count, that is, increases the count value Count with increments of one. The counter 51V has a reset terminal to which the output signal of the AND gate 56V is supplied and a set terminal to which the pseudo vertical sync signal is supplied from the pseudo signal generator 55V. The counter 51V also has a data terminal to which a setting value DATA_SET is supplied from the subtracter 58V. When the reset terminal is asserted, the count value Count of the counter 51V is reset to a predetermined reset value (typically, "0".) When the set terminal is asserted, the count value Count of the counter 51V is set to the setting value DATA_SET.

The upper limit register 52V holds a predetermined upper limit value. As described later, the upper limit value held by the upper limit register 52V indicates the count value Count at which the pseudo vertical sync signal is to be asserted in the counting operation of the counter 51V.

The lower limit register 53V holds a predetermined lower limit value. As described later, the lower limit value held by the lower limit register 53V indicates a range of the count value Count in which the assertion of the vertical sync source signal $V_{SYNC\_SRC}$ is prohibited in the counting operation of the counter 51V. The lower limit value held by the lower limit register 53V is smaller than the upper limit value held by the upper limit register 52V.

The comparator 54V compares the count value Count of the counter 51V with the upper and lower limit values held by the upper and lower limit registers 52V and 53V, and generates enable signals Enable1 and Enable2 in response to the comparison results. The enable signal Enable1 is a signal which allows assertion of the vertical sync source signal $V_{SYNC\_SRC}$ and the enable signal Enable2 is a signal which allows assertion of the pseudo vertical sync signal.

More specifically, when the count value Count is smaller than the lower limit value held by the lower limit register 53V, the comparator 54V negates both of the enable signals Enable1 and Enable2. When the count value Count is counted up and reaches the lower limit value held by the lower limit register 53V, the comparator 54V asserts the enable signal Enable1. Further, the enable signal Enable2 remains negated. When the count value Count is further counted up and reaches the upper limit value held by the upper limit register 52V, the comparator 54V asserts the enable signal Enable2 for a predetermined period of time. After asserting the enable signal Enable2 for a predetermined period of time, the comparator 54V negates both of the enable signals Enable1 and Enable2.

The pseudo signal generator 55V generates the pseudo vertical sync signal in response to the enable signal Enable2 received from the comparator 54V. More specifically, the pseudo signal generator 55V asserts the pseudo vertical sync signal for a predetermined period of time when the enable signal Enable2 is asserted.

The AND gate 56V has a first input receiving the vertical sync packet detect signal $V_{SYNC\_DTC}$ and a second input receiving the enable signal Enable1. The AND gate 56V outputs an output signal indicating the logical product of the vertical sync packet detect signal $V_{SYNC\_DTC}$ and the enable signal Enable1. As described above, the output signal of the AND gate 56V is used to reset the counter 51V.

The expected value register 57V holds an expected value which is a value corresponding to an expected time duration of one frame period (one vertical sync period).

The subtracter 58V calculates the setting value DATA_SET to be set to the counter 51V as a value obtained by subtracting the expected value held by the expected value register 57V from the upper limit value held by the upper limit register 52V.

In one embodiment the display driver IC 2 is configured so that the upper limit value set to the upper limit register 52V is rewritable from an external entity (for example, the host 3). For example, when a packet describing an upper limit value to be set to the upper limit register 52V is transmitted from the host 3 to the display driver IC 2, this packet is forwarded from the lane control interface circuit 12 to the system interface circuit 13 as a part of the received data train $D_{RCV}$. The upper limit value described in this packet is written into the upper limit register 52V. Similarly, in various embodiment, the display driver IC 2 is configured so that the lower limit value set to the lower limit register 53V and the expected value set to the expected value register 57V are rewritable from an external entity (for example, the host 3).

The logic circuit section 44V generates the vertical sync source signal $V_{SYNC\_SRC}$ to be supplied to the timing generator circuit 17 from the vertical sync packet detect signal $V_{SYNC\_DTC}$ received from the vertical/horizontal sync packet detect section 41, the enable signal Enable1 received from the comparator 54V and the pseudo vertical sync signal received from the pseudo signal generator 55V.

More specifically, the logic circuit section 44V includes an AND gate 61V and an OR gate 62V. The AND gate 61V has a first input receiving the vertical sync packet detect signal VSYNC_DTC from the vertical/horizontal sync packet detect section 41 and a second input receiving the enable signal Enable1 from the comparator 54V. The OR gate 62V has a first input receiving the output signal of the AND gate 61V and a second input receiving the pseudo vertical sync signal from the pseudo vertical sync signal generator section 43V.

The logic circuit section 44V may be configured to operate as follows:
(1) the logic circuit section 44V asserts the vertical sync source signal $V_{SYNC\_SRC}$ when the vertical sync packet detect signal $V_{SYNC\_DTC}$ is asserted with the enable signal Enable1 asserted;
(2) the logic circuit section 44V asserts the vertical sync source signal $V_{SYNC\_SRC}$ when the pseudo vertical sync signal is asserted.

It should be noted that the vertical sync source signal $V_{SYNC\_SRC}$ is not asserted in the state in which the enable signal Enable1 is negated, even when the vertical sync packet detect signal $V_{SYNC\_DTC}$ is asserted.

With reference to FIG. 7, the horizontal sync source signal generator section 42H is configured and operates similarly to the vertical sync source signal generator section 42V, except for that the horizontal sync source signal generator section 42H receives the horizontal sync packet detect signal $H_{SYNC\_DTC}$ in place of the vertical sync packet detect signal $V_{SYNC\_DTC}$ and generates the horizontal sync source signal $H_{SYNC\_SRC}$ in place of the vertical sync source signal $V_{SYNC\_SRC}$.

The horizontal sync source signal generator section 42H includes a pseudo horizontal sync signal generator section 43H and a logic circuit section 44H. The pseudo horizontal sync signal generator section 43H includes a counter 51H and generates a pseudo horizontal sync signal in response to the count value Count held by the counter 51H. The pseudo horizontal sync signal generator section 43H is configured similarly to the pseudo vertical sync signal generator section 43V; the pseudo horizontal sync signal generator section 43H includes, in addition to the counter 51H, an upper limit register 52H, an lower limit register 53H, a comparator 54H, a pseudo signal generator 55H, an AND gate 56H, an expected value register 57H, and a subtracter 58H.

The logic circuit section 44H generates the horizontal sync source signal $H_{SYNC\_SRC}$ to be supplied to the timing generator circuit 17 from the horizontal sync packet detect signal $H_{SYNC\_DTC}$ received from the vertical/horizontal sync packet detect section 41, the enable signal Enable1 received from the comparator 54H and the pseudo horizontal sync signal received from the pseudo signal generator 55H. The configuration of the logic circuit section 44H is the same as that of the logic circuit section 44V of the vertical sync source signal generator section 42V; the logic circuit section 44H includes an AND gate 61H and an OR gate 62H.

In various embodiments, the display driver IC 2 is configured so that the upper limit value set to the upper limit register 52H is rewritable from an external entity (for example, the host 3). Similarly, in one or more embodiments, that the display driver IC 2 is configured so that the lower limit value set to the lower limit register 53H and the expected value set to the expected value register 57H are rewritable from an external entity (for example, the host 3).

The timing generator circuit 17 receives the vertical sync source signal $V_{SYNC\_SRC}$ output from the logic circuit section 44V of the vertical sync source signal generator section 42V and the horizontal sync source signal $H_{SYNC\_SRC}$ output from the logic circuit section 44H of the horizontal sync source signal generator section 42H. The timing generator circuit 17 includes an internal sync signal generator circuit 45 which generates an internal vertical sync signal $V_{SYNC\_INT}$ and an internal horizontal sync signal $H_{SYNC\_INT}$ in response to the vertical sync source signal $V_{SYNC\_SRC}$ and the horizontal sync source signal $H_{SYNC\_SRC}$. The internal sync signal generator circuit 45 asserts the internal vertical sync signal $V_{SYNC\_INT}$ in response to an assertion of the vertical sync source signal $V_{SYNC\_SRC}$ and asserts the internal horizontal sync signal $H_{SYNC\_INT}$ in response to an assertion of the horizontal sync source signal $H_{SYNC\_SRC}$.

The internal vertical sync signal $V_{SYNC\_INT}$ and the internal horizontal sync signal $H_{SYNC\_INT}$ generated by the internal sync signal generator circuit 45 of the timing generator circuit 17 are used for control of the operation timing of the circuits integrated in the display driver IC 2, for example, control of the operation timing of the source driver circuit 15 and the panel interface circuit 16. The source driver circuit 15 drives the source lines 7 in synchronization with assertions of the internal vertical sync signal $V_{SYNC\_INT}$ and the internal horizontal sync signal $H_{SYNC\_INT}$. The panel interface circuit 16 generates the source control signals supplied to the gate driver circuits 5 in synchronization with assertions of the internal vertical sync signal $V_{SYNC\_INT}$ and the internal horizontal sync signal $H_{SYNC\_INT}$.

Next, a description is given of details of the operation of display driver IC 2 according to one or more embodiments of the disclosure, especially the operation of the vertical/horizontal sync extraction circuit 26.

Figure 8:
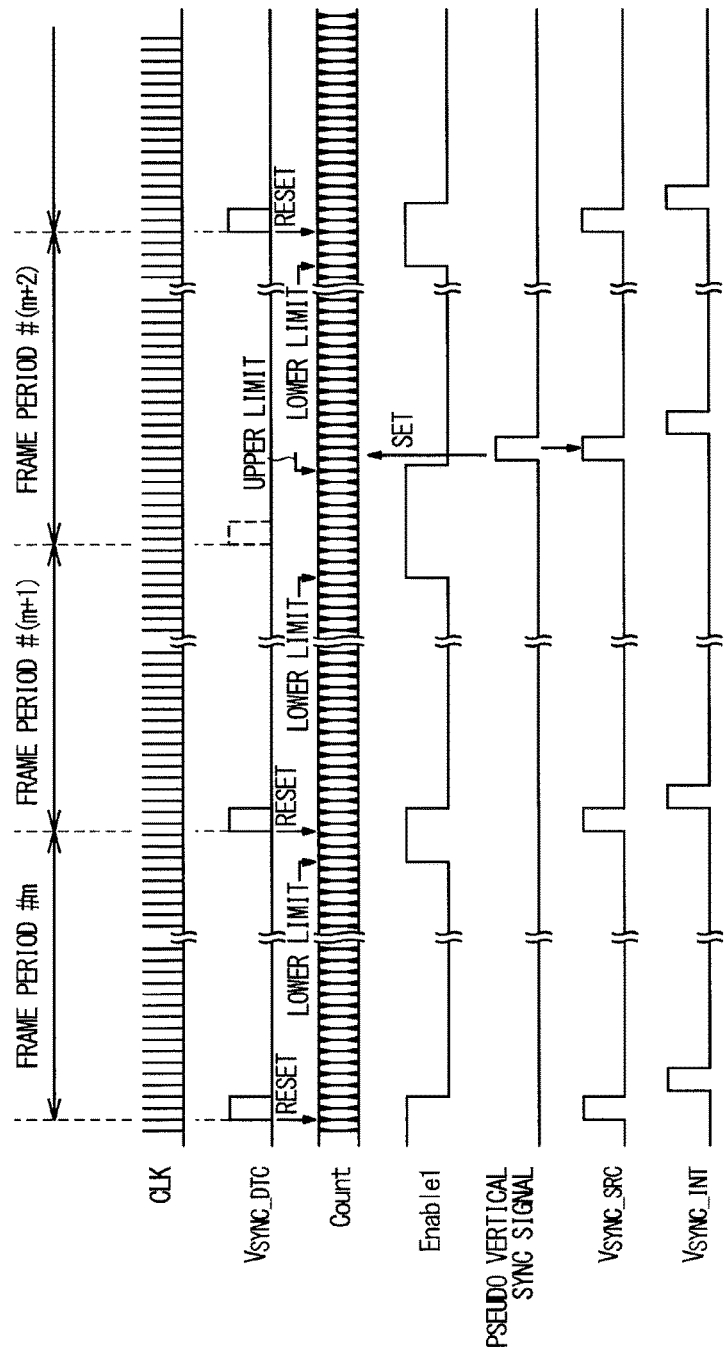
FIG. 8 is a timing chart illustrating an exemplary operation of the vertical sync source signal generator section according to one or more embodiments of the disclosure.
Figure 9:
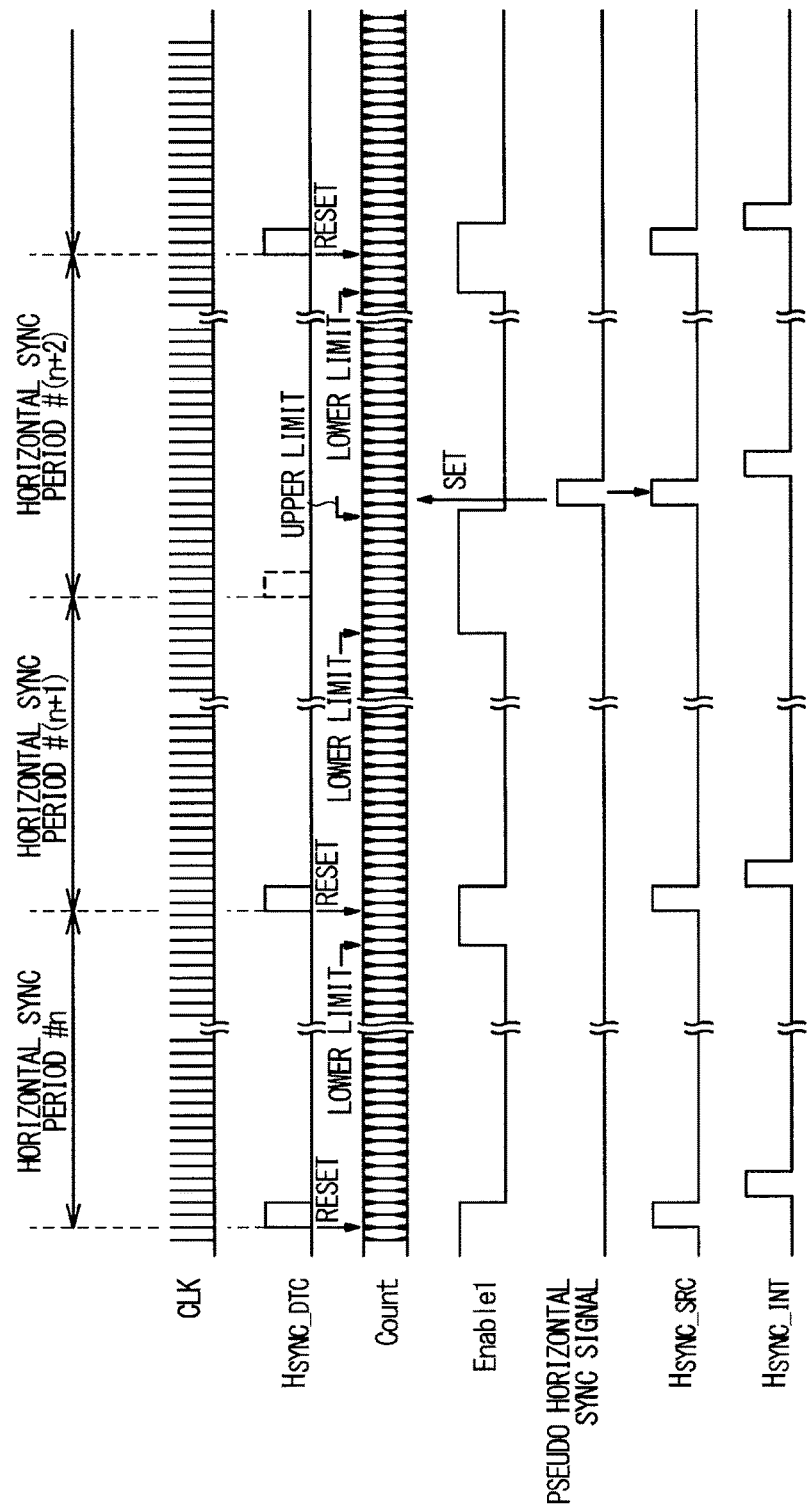
FIG. 9 is a timing chart illustrating an exemplary operation of the horizontal sync source signal generator section according to one or more embodiments of the disclosure.

FIGS. 8 and 9 are timing charts illustrating an exemplary operation of the vertical/horizontal sync extraction circuit 26 according to one or more embodiments of the disclosure. More specifically, FIG. 8 illustrates an exemplary operation of the vertical sync source signal generator section 42V of the vertical/horizontal sync extraction circuit 26 and FIG. 9 illustrates an exemplary operation of the horizontal sync source signal generator section 42H. In the following, a description is first given of the operation of the vertical sync source signal generator section 42V.

FIG. 8 illustrates the operation of the vertical sync source signal generator section 42V in three frame periods #m to #(m+2). In FIG. 8, frame periods #m to #(m+2) (vertical sync periods #m to #(m+2)) are defined on the basis of the times when the host 3 transmits vertical sync packets to the display driver IC 2. In the following, the operation of the vertical sync source signal generator section 42V is described for the case when the display driver IC 2 successfully receives vertical sync packets at the beginnings of frame period #(m+1) and its former frame periods and unsuccessfully receives a vertical sync packet at the beginning of frame period #(m+2).

When a vertical sync packet is successfully received by the display driver IC 2 at the beginning of frame period #m, the vertical sync packet is detected by the vertical/horizontal sync packet detect section 41 and the vertical sync packet detect signal $V_{SYNC\_DTC}$ is asserted. When the vertical sync packet detect signal $V_{SYNC\_DTC}$ is asserted, the vertical sync source signal $V_{SYNC\_SRC}$ is also asserted by the logic circuit section 44V. It should be noted that the enable signal Enable1 is asserted at the beginning of each frame period when a vertical sync packet is successfully received by the display driver IC 2 in the previous frame period, as understood from the description given below.

In the timing generator circuit 17, the internal vertical sync signal $V_{SYNC\_INT}$ is asserted by the internal sync signal generator circuit 45 in synchronization with the assertion of the vertical sync source signal $V_{SYNC\_SRC}$. In one embodiment, the internal vertical sync signal $V_{SYNC\_INT}$ is asserted when a predetermined delay time has passed after the assertion of the vertical sync source signal $V_{SYNC\_SRC}$.

In one or more embodiments, in response to the assertion of the vertical sync packet detect signal $V_{SYNC\_DTC}$, the reset terminal of the counter 51V is asserted to reset the counter 51V to a predetermined reset value (typically "0"); it should be also noted that the enable signal Enable1 remains asserted at this moment. When the counter 51V is reset, the count value of the counter 51V becomes smaller than the lower limit value held by the lower limit register 53V and therefore the enable signal Enable1 is negated by the comparator 54V. Since the enable signal Enable1 is negated, the vertical sync source signal $V_{SYNC\_SRC}$ is also negated by the logic circuit section 44V.

This is followed by counting up the count value of the counter 51V. The enable signal Enable1 remains negated until the count value of the counter 51V reaches the lower limit value held by the lower limit register 53V. Since the enable signal Enable1 remains negated, the vertical sync source signal $V_{SYNC\_SRC}$ is not asserted, remaining negated, even when the vertical/horizontal sync packet detect section 41 erroneously detects a vertical sync packet due to a malfunction and erroneously asserts the vertical sync packet detect signal $V_{SYNC\_DTC}$. This operation effectively improves the reliability of the display driver IC 2.

When the count value of the counter 51V is further counted up and reaches the lower limit value held by the lower limit register 53V, the enable signal Enable1 is asserted by the comparator 54V. This places the vertical sync source signal generator section 42V into a state in which the vertical sync source signal generator section 42V is ready to assert the vertical sync source signal $V_{SYNC\_SRC}$ when a vertical sync packet is detected thereafter.

When a vertical sync packet is then successfully received by the display driver IC 2 at the beginning of frame period #(m+1), the vertical sync packet is detected by the vertical/horizontal sync packet detect section 41 and the same operation as that performed at the beginning of frame period #m is then performed. In detail, the vertical sync packet detect signal $V_{SYNC\_DTC}$ is asserted by the vertical/horizontal sync packet detect section 41 and the vertical sync source signal $V_{SYNC\_SRC}$ is also asserted by the logic circuit section 44V. In the timing generator circuit 17, the internal vertical sync signal $V_{SYNC\_INT}$ is asserted when a predetermined delay time has passed after the assertion of the vertical sync source signal $V_{SYNC\_SRC}$. Additionally, the reset terminal of the counter 51V is asserted in response to the assertion of the vertical sync packet detect signal $V_{SYNC\_DTC}$ to reset the counter 51V. When the counter 51V is reset, the enable signal Enable1 is negated and the vertical sync source signal $V_{SYNC\_SRC}$ is also negated by the logic circuit section 44V.

This is followed by counting up the count value of the counter 51V. When the count value of the counter 51V reaches the lower limit value held by the lower limit register 53V, the enable signal Enable1 is asserted.

Discussed below is the case when the display driver IC 2 fails to successfully receive a vertical sync packet at the beginning of frame period #(m+2), which follows frame period #(m+1). In this case, the vertical sync packet detect signal $V_{SYNC\_DTC}$ is not asserted at the beginning of frame period #(m+2) and the counter 51V continues to count up the count value.

When the count value of the counter 51V reaches the upper limit value held by the upper limit register 52V, the enable signal Enable2 is asserted by the comparator 54V. In response to the assertion of the enable signal Enable2, the pseudo signal generator 55V asserts the pseudo vertical sync signal. Since the pseudo vertical sync signal is asserted, the vertical sync source signal $V_{SYNC\_SRC}$, which is output from the OR gate 62V, is also asserted. As a result, the internal vertical sync signal $V_{SYNC\_INT}$ is asserted when a predetermined delay time has passed after the assertion of the vertical sync source signal $V_{SYNC\_SRC}$.

In the operation described above, the vertical sync source signal $V_{SYNC\_SRC}$ is asserted and then the internal vertical sync single $V_{SYNC\_INT}$ is also asserted when a period of time corresponding to the upper limit value set in the upper limit register 52V has passed after the vertical sync source signal $V_{SYNC\_SRC}$ has been asserted previously, even if a vertical sync packet is not successfully received. This operation effectively suppresses disturbance of the displayed image, since the internal vertical sync signal $V_{SYNC\_INT}$ is asserted even when a vertical sync packet is not successfully received due to noise or other causes.

It should be noted that the vertical sync source signal $V_{SYNC\_SRC}$ is asserted relatively late in frame period #(m+2), in which the vertical sync packet is not successfully received, compared with frame periods #m and #(m+1), in which a vertical sync packet is successfully received. Accordingly, the time duration from the assertion of the vertical sync source signal $V_{SYNC\_SRC}$ to the assertion of the enable signal Enable1 should be set shorter in frame period #(m+2). Also, the time duration from the assertion of the vertical sync source signal $V_{SYNC\_SRC}$ in frame period #(m+2) to the assertion of the pseudo vertical sync signal (or the enable signal Enable2) when a vertical sync packet is not successfully received should be set shorter in the next frame period of frame period #(m+2)

In view of the above, the counter 51V is set to the setting value DATA_SET in response to an assertion of the pseudo vertical sync signal according to one or more embodiments of the disclosure. In one embodiment, in which the counter 51V counts up the count value Count, the setting value DATA_SET is determined as being larger than the reset value (typically "0"). Such setting allows asserting the enable signal Enable1 and the pseudo vertical sync period (or the enable signal Enable2) at appropriate timing even when the assertion of the vertical sync source signal $V_{SYNC\_SRC}$ is delayed in a frame period in which a vertical sync packet is not successfully received.

In one embodiment, the setting value DATA_SET is calculated by subtracting the expected value set in the expected value register 57V from the upper limit value set in the upper limit register 52V. Set in the expected value register 57V is a value corresponding to the expected time duration of the frame period. Since the upper limit value set in the upper limit register 52V corresponds to the time duration from a successful reception of a vertical sync packet in a frame period to an assertion of the pseudo vertical sync period (or the enable signal Enable2) in the next frame period in which the vertical sync packet is not successfully received, the setting value DATA_SET is consequently set to such a value that the delay of the assertion of the vertical sync source signal $V_{SYNC\_SRC}$ is compensated in the frame period in which the vertical sync packet is not successfully received.

It should be noted however that the setting value DATA_SET is not limited to the value obtained by subtracting the expected value set in the expected value register 57V from the upper limit value set in the upper limit register 52V. For example, the setting value DATA_SET may be unconditionally set to a specific fixed value.

The counter 51V may be configured to count down the count value Count, for example, decrease the count value Count with decrements of one. In this case, the comparator 54V is configured to assert the enable signal Enable1 when the count value Count is decreased down to the upper limit value set in the upper limit register 52V, and subsequently assert the pseudo vertical sync signal (and the enable signal Enable2) when a vertical sync packet is not successfully received and the count value Count is decreased down to the lower limit value set in the lower limit register 53V. The setting value DATA_SET is calculated by adding the expected value set in the expected value register 57V to the lower limit value set in the lower limit register 53V. Also in this case, the setting value DATA_SET is not limited to the value obtained by adding the expected value set in the expected value register 57V to the lower limit value set in the lower limit register 53V. For example, the setting value DATA_SET may be unconditionally set to a specific fixed value. Also when the counter 51V counts down the count value Count, the vertical sync source signal generator section 42V operates similarly to when the counter 51V counts up the count value Count, through modifying the operation of the comparator 54V.

With reference to FIG. 9, the horizontal sync source signal generator section 42H operates similarly to the vertical sync source signal generator section 42V, except for that the horizontal sync source signal generator section 42H receives the horizontal sync packet detect signal $H_{SYNC\_DTC}$ in place of the vertical sync packet detect signal $V_{SYNC\_DTC}$, and generates the horizontal sync source signal $H_{SYNC\_SRC}$ in response to the horizontal sync packet detect signal $H_{SYNC\_DTC}$.

FIG. 9 illustrates the operation of the horizontal sync source signal generator section 42H in three horizontal sync periods #n to #(n+2). In FIG. 9, horizontal sync periods #n to #(n+2) are defined on the basis of the times when the host 3 transmits horizontal sync packets to the display driver IC 2. In the following, the operation of the horizontal sync source signal generator section 42H is described for the case when the display driver IC 2 successfully receives horizontal sync packets at the beginnings of horizontal sync period #(n+1) and its former horizontal sync periods and unsuccessfully receives a vertical sync packet at the beginning of horizontal sync period #(n+2).

When a horizontal sync packet is successfully received by the display driver IC 2 at the beginning of horizontal sync period #n, the horizontal sync packet is detected by the vertical/horizontal sync packet detect section 41 and the horizontal sync packet detect signal $H_{SYNC\_DTC}$ is asserted. When the horizontal sync packet detect signal $H_{SYNC\_DTC}$ is asserted, the horizontal sync source signal $H_{SYNC\_SRC}$ is also asserted by the logic circuit section 44H. It should be noted that the enable signal Enable1 is asserted at the beginning of each horizontal sync period when a horizontal sync packet is successfully received by the display driver IC 2 in the previous horizontal sync period, as understood from the description given below.

In the timing generator circuit 17, the internal horizontal sync signal $H_{SYNC\_INT}$ is asserted by the internal sync signal generator circuit 45 in synchronization with the assertion of the horizontal sync source signal $H_{SYNC\_SRC}$. In one embodiment, the internal horizontal sync signal $H_{SYNC\_INT}$ is asserted when a predetermined delay time has passed after the assertion of the horizontal sync source signal $H_{SYNC\_SRC}$.

In one or more embodiments, in response to the assertion of the horizontal sync packet detect signal $H_{SYNC\_DTC}$, the reset terminal of the counter 51H is asserted to reset the counter 51H to a predetermined reset value (typically "0"); it should be also noted that the enable signal Enable1 remains asserted at this moment. When the counter 51H is reset, the count value of the counter 51H becomes smaller than the lower limit value held by the lower limit register 53H and therefore the enable signal Enable1 is negated by the comparator 54H. Since the enable signal Enable1 is negated, the vertical sync source signal $H_{SYNC\_SRC}$ is also negated by the logic circuit section 44H.

This is followed by counting up the count value of the counter 51H. The enable signal Enable1 remains negated until the count value of the counter 51H reaches the lower limit value held by the lower limit register 53H. Since the enable signal Enable1 remains negated, the vertical sync source signal $V_{SYNC\_SRC}$ is not asserted, remaining negated, even when the vertical/horizontal sync packet detect section 41 erroneously detects a horizontal sync packet due to a malfunction and erroneously asserts the horizontal sync packet detect signal $H_{SYNC\_DTC}$. This operation effectively improves the reliability of the display driver IC 2.

When the count value of the counter 51H is further counted up and reaches the lower limit value held by the lower limit register 53H, the enable signal Enable1 is asserted by the comparator 54H. This places the horizontal sync source signal generator section 42H into a state in which the horizontal sync source signal generator section 42H is ready to assert the horizontal sync source signal $H_{SYNC\_SRC}$ when a horizontal sync packet is detected thereafter.

When a horizontal sync packet is then successfully received by the display driver IC 2 at the beginning of horizontal sync period #(n+1), the horizontal sync packet is detected by the vertical/horizontal sync packet detect section 41 and the same operation as that performed at the beginning of horizontal sync period #n is then performed. In detail, the horizontal sync packet detect signal $H_{SYNC\_DTC}$ is asserted by the vertical/horizontal sync packet detect section 41 and the horizontal sync source signal $H_{SYNC\_SRC}$ is also asserted by the logic circuit section 44H. In the timing generator circuit 17, the internal horizontal sync signal $H_{SYNC\_INT}$ is asserted when a predetermined delay time has passed after the assertion of the horizontal sync source signal $H_{SYNC\_SRC}$. Additionally, the reset terminal of the counter 51H is asserted in response to the assertion of the horizontal sync packet detect signal $H_{SYNC\_DTC}$ to reset the counter 51H. When the counter 51H is reset, the enable signal Enable1 is negated and the horizontal sync source signal $H_{SYNC\_SRC}$ is also negated by the logic circuit section 44H.

This is followed by counting up the count value of the counter 51H. When the count value of the counter 51H reaches the lower limit value held by the lower limit register 53H, the enable signal Enable1 is asserted.

Discussed below is the case when the display driver IC 2 fails to successfully receive a horizontal sync packet at the beginning of horizontal sync period #(n+2), which follows horizontal sync period #(n+1). In this case, the horizontal sync packet detect signal $H_{SYNC\_DTC}$ is not asserted at the beginning of horizontal sync period #(n+2) and the counter 51H continues to count up the count value.

When the count value of the counter 51H reaches the upper limit value held by the upper limit register 52H, the enable signal Enable2 is asserted by the comparator 54H. In response to the assertion of the enable signal Enable2, the pseudo signal generator 55H asserts the pseudo horizontal sync signal. Since the pseudo horizontal sync signal is asserted, the horizontal sync source signal $H_{SYNC\_SRC}$, which is output from the OR gate 62H, is also asserted. As a result, the internal horizontal sync signal $H_{SYNC\_INT}$ is asserted when a predetermined delay time has passed after the assertion of the horizontal sync source signal $H_{SYNC\_SRC}$.

In the operation described above, the horizontal sync source signal $H_{SYNC\_SRC}$ is asserted and then the internal horizontal sync single $H_{SYNC\_INT}$ is also asserted when a period of time corresponding to the upper limit value set in the upper limit register 52H has passed after the horizontal sync source signal $H_{SYNC\_SRC}$ has been asserted previously, even if a horizontal sync packet is not successfully received. This operation effectively suppresses disturbance of the displayed image, since the internal horizontal sync signal $H_{SYNC\_INT}$ is asserted even when a horizontal sync packet is not successfully received due to noise or other causes.

The horizontal sync source signal $H_{SYNC\_SRC}$ is asserted relatively late in horizontal sync period #(m+2), in which the horizontal sync packet is not successfully received, compared with horizontal sync periods #m and #(m+1), in which a horizontal sync packet is successfully received. Accordingly, the time duration from the assertion of the horizontal sync source signal $H_{SYNC\_SRC}$ to the assertion of the enable signal Enable1 may be set shorter in horizontal sync period #(m+2). Also, the time duration from the assertion of the horizontal sync source signal $H_{SYNC\_SRC}$ in horizontal sync period #(n+2) to the assertion of the pseudo horizontal sync signal (or the enable signal Enable2) when a horizontal sync packet is not successfully received may be set shorter in the next horizontal sync period of horizontal sync period # (n+2)

In view of the above, the counter 51H is set to the setting value DATA_SET in response to an assertion of the pseudo horizontal sync signal in one embodiment. In one embodiment, in which the counter 51H counts up the count value Count, the setting value DATA_SET is determined as being larger than the reset value (typically "0"). Such setting allows asserting the enable signal Enable1 and the pseudo horizontal sync period (or the enable signal Enable2) at appropriate timing even when the assertion of the horizontal sync source signal $H_{SYNC\_SRC}$ is delayed in a horizontal sync period in which a horizontal sync packet is not successfully received.

In one embodiment, the setting value DATA_SET is calculated by subtracting the expected value set in the expected value register 57H from the upper limit value set in the upper limit register 52H. Set in the expected value register 57H is a value corresponding to the expected time duration of the frame period. Since the upper limit value set in the upper limit register 52H corresponds to the time duration from a successful reception of a horizontal sync packet in a horizontal sync period to an assertion of the pseudo horizontal sync period (or the enable signal Enable2) in the next frame period in which the horizontal sync packet is not successfully received, the setting value DATA_SET is consequently set to such a value that the delay of the assertion of the horizontal sync source signal $H_{SYNC\_SRC}$ is compensated in the horizontal sync period in which the horizontal sync packet is not successfully received.

It should be noted however that the setting value DATA_SET is not limited to the value obtained by subtracting the expected value set in the expected value register 57H from the upper limit value set in the upper limit register 52H. For example, the setting value DATA_SET may be unconditionally set to a specific fixed value.

The counter 51H may be configured to count down the count value Count, for example, decrease the count value Count with decrements of one. In this case, the comparator 54H is configured to assert the enable signal Enable1 when the count value Count is decreased down to the upper limit value set in the upper limit register 52H, and subsequently assert the pseudo horizontal sync signal (and the enable signal Enable2) when a horizontal sync packet is not successfully received and the count value Count is decrease down to the lower limit value set in the lower limit register 53H. The setting value DATA_SET is calculated by adding the expected value set in the expected value register 57H to the lower limit value set in the lower limit register 53H. Also in this case, the setting value DATA_SET is not limited to the value obtained by adding the expected value set in the expected value register 57H to the lower limit value set in the lower limit register 53H. For example, the setting value DATA_SET may be unconditionally set to a specific fixed value. Also when the counter 51H counts down the count value Count, the horizontal sync source signal generator section 42H operates similarly to when the counter 51H counts up the count value Count, through modifying the operation of the comparator 54H.

In one embodiment, the vertical sync source signal is not asserted when the count value does not reach a predetermined lower limit value even if the vertical sync period start instruction detect signal is asserted.

In one embodiment, the vertical sync source signal is not asserted when the count value does not reach a predetermined upper limit value even if the vertical sync period start instruction detect signal is asserted.

In one embodiment, the horizontal sync source signal is asserted when the count value does not reach a predetermined lower limit value even if the horizontal sync period start instruction detect signal is asserted.

In one embodiment, the horizontal sync source signal is not asserted when the count value does not reach a predetermined upper limit value even if the horizontal sync period start instruction detect signal is asserted.

As described above, in one embodiment, the vertical sync source signal $V_{SYNC\_SRC}$ is asserted when a predetermined period of time has passed after the vertical sync source signal $V_{SYNC\_SRC}$ has been asserted previously, even when the display driver IC 2 fails to successfully receive a vertical sync packet in a period in which the vertical sync packet is expected to be transmitted to the display driver IC 2. Similarly, the horizontal sync source signal $H_{SYNC\_SRC}$ is asserted when a predetermined period of time has passed after the horizontal sync source signal $H_{SYNC\_SRC}$ has been asserted previously, even when the display driver IC 2 fails to successfully receive a horizontal sync packet in a period in which the horizontal sync packet is expected to be transmitted to the display driver IC 2. Such operation effectively suppresses disturbance in the displayed image even when the display driver IC 2 temporarily fails to successfully receive a vertical sync packet or a horizontal sync packet.

Although various embodiments of the present disclosure have been specifically described, the present invention must not be construed as being limited to the above-described embodiments. It would be apparent to a person skilled in the art that the present invention may be implemented with various modifications.

For example, although the above-described embodiments recite that the display device 10 is configured to display images on the LCD panel 1, the present invention is applicable to a display device configured to display images on a different display panel (such as an OLED (organic light emitting diode) display panel).

Although the above-described embodiments recite the configuration of the vertical/horizontal sync extraction circuit 26 adapted to unsuccessful reception of both of vertical sync packets and horizontal sync packets, the vertical/horizontal sync extraction circuit 26 may be configured to be adapted to unsuccessful reception only of vertical sync packets or only of horizontal sync packets. When the vertical/horizontal sync extraction circuit 26 is configured to be adapted to unsuccessful reception only of vertical sync packets, the horizontal sync source signal generator section 42H is not provided; in this case, the horizontal sync packet detect signal $H_{SYNC\_DTC}$ is readily used as the horizontal sync source signal $H_{SYNC\_SRC}$. When the vertical/horizontal sync extraction circuit 26 is configured to be adapted to unsuccessful reception only of horizontal sync packets, on the other hand, the vertical sync source signal generator section 42V is not provided; in this case, the vertical sync packet detect signal $V_{SYNC\_DTC}$ is readily used as the vertical sync source signal $V_{SYNC\_SRC}$.

Although the above-described embodiments recite that a vertical sync packet is used as a vertical sync period start instruction which indicates the start of a vertical sync period, an external vertical sync signal supplied from the host 3 to the display driver IC 2 may be used as the vertical sync period start instruction. In this case, when an assertion of the external vertical sync signal is detected, the circuits integrated in the display driver IC 2 (including the vertical/horizontal sync extraction circuit 26) perform the same operation as that performed in the case when a vertical sync packet is detected in the above-described embodiment.

Similarly, although the above-described embodiments recite that a horizontal sync packet is used as a horizontal sync period start instruction which indicates the start of a horizontal sync period, an external horizontal sync signal supplied from the host 3 to the display driver IC 2 may be used as the horizontal sync period start instruction. In this case, when an assertion of the external horizontal sync signal is detected, the circuits integrated in the display driver IC 2 (including the vertical/horizontal sync extraction circuit 26) perform the same operation as that performed in the case when a horizontal sync packet is detected in the above-described embodiment.

This configuration effectively suppresses disturbance of the display image even when vertical and horizontal synchronizations are not successfully achieved due to noise applied to signal lines which supply the external vertical sync signal and the external horizontal sync signal.

What is claimed is:

1. A display driver for driving a display panel, comprising:
    a sync extraction circuit comprising:
        a vertical sync period start instruction detect section configured to detect a vertical sync period start instruction to generate a vertical sync period start instruction detect signal, the vertical sync period start instruction being supplied external from of the display driver;
        a pseudo vertical sync signal generator section including a counter, the pseudo vertical sync signal generator section configured to generate a pseudo vertical sync signal in response to a count value held by the counter; and
        a logic circuit section configured to generate a vertical sync source signal in response to the vertical sync period start instruction detect signal and the pseudo vertical sync signal, and the sync extraction circuit is configured to:
            assert the vertical sync source signal based on a detection of the vertical sync period start instruction; and
            assert the vertical sync source signal based on a determination that a predetermined period of time has passed after a previous assertion of the vertical sync source signal; and
    a timing generator circuit configured to:
        generate an internal vertical sync signal in response to the vertical sync source signal; and
        assert the internal vertical sync signal in response to the assertion of the vertical sync source signal; and
    a drive circuit configured to drive the display panel in synchronization with the internal vertical sync signal.

2. The display driver according to claim 1, wherein the vertical sync period start instruction detect section is configured to assert the vertical sync period start instruction detect signal when detecting the vertical sync period start instruction, wherein the counter is configured to count up the count value,
    wherein the pseudo vertical sync signal generator section is further configured to assert the pseudo vertical sync signal in response to the count value reaching a predetermined upper limit value,
    wherein the logic circuit section is further configured to assert the vertical sync source signal in response to an assertion of the vertical sync period start instruction detect signal and an assertion of the pseudo vertical sync signal,
    wherein the counter is configured to be reset to a predetermined reset value in response to the assertion of the vertical sync period start instruction detect signal, and
    wherein the counter is further configured so that the count value thereof is set to a predetermined value larger than the reset value in response to the assertion of the pseudo vertical sync signal.

3. The display driver according to claim 2, wherein the logic circuit section does not assert the vertical sync source signal when the count value does not reach a predetermined lower limit value.

4. The display driver according to claim 2, further comprising an upper limit register configured to hold the upper limit value.

5. The display driver according to claim 4, wherein the upper limit value held by the upper limit register is rewritable from outside of the display driver.

6. The display driver according to claim 1, wherein the vertical sync period start instruction detect section is configured to assert the vertical sync period start instruction detect signal when detecting the vertical sync period start instruction,
    wherein the counter is further configured to count down the count value,
    wherein the pseudo vertical sync signal generator section is further configured to assert the pseudo vertical sync signal in response to the count value reaching a predetermined lower limit value, wherein the logic circuit section is further configured to assert the vertical sync source signal in response to an assertion of the vertical sync period start instruction detect signal and an assertion of the pseudo vertical sync signal, wherein the counter is further configured to be reset to a predetermined reset value in response to the assertion of the vertical sync period start instruction detect signal, and wherein the counter is further configured so that the count value thereof is set to a predetermined value smaller than the reset value in response to the assertion of the pseudo vertical sync signal.

7. The display driver according to claim 6, wherein the logic circuit section does not assert the vertical sync source signal when the count value does not reach a predetermined upper limit value even.

8. The display driver according to claim 1, wherein the vertical sync period start instruction includes a vertical sync packet supplied to the display driver.

9. The display driver according to claim 1, wherein the sync extraction circuit is further configured to generate a horizontal sync source signal in response to a horizontal sync period start instruction indicating a start of a horizontal sync period, the horizontal sync period start instruction being supplied from outside of the display driver, wherein the timing generator is further configured to generate an internal horizontal sync signal in response to the horizontal sync source signal, wherein the drive circuit is further configured to drive the display panel in synchronization with the internal horizontal sync signal, wherein the timing generator circuit is further configured to assert the internal horizontal sync signal in response to an assertion of the horizontal sync source signal, wherein the sync extraction circuit is further configured to assert the horizontal sync source signal when detecting the horizontal sync period start instruction, and wherein the sync extraction circuit is further configured to assert the horizontal sync source signal when a predetermined period of time has passed after a previous assertion of the horizontal sync source signal.

10. A display driver for driving a display panel, comprising:
a sync extraction circuit comprising:
  a horizontal sync period start instruction detect section configured to detect a vertical sync period start instruction to generate a vertical sync period start instruction detect signal, the horizontal sync period start instruction being supplied from outside of the display driver;
  a pseudo horizontal sync signal generator section including a counter, the pseudo horizontal sync signal generator configured to generate a pseudo horizontal sync signal in response to a count value held by the counter; and
  a logic circuit section configured to generate a horizontal sync source signal in response to the horizontal sync period start instruction detect signal and the pseudo horizontal sync signal, and the sync extraction circuit is configured to:
    assert the horizontal sync source signal when detecting the horizontal sync period start instruction; and
    assert the horizontal sync source signal when a predetermined period of time has passed after a previous assertion of the horizontal sync source signal; and
a timing generator configured to:
  generate an internal horizontal sync signal in response to the horizontal sync source signal; and
  assert the internal horizontal sync signal in response to an assertion of the horizontal sync source signal; and
a drive circuit configured to drive the display panel in synchronization with the internal horizontal sync signal.

11. The display driver according to claim 10, wherein the horizontal sync period start instruction detect section is configured to assert the horizontal sync period start instruction detect signal when detecting the horizontal sync period start instruction, wherein the counter is configured to count up the count value, wherein the pseudo horizontal sync signal generator section is further configured to assert the pseudo horizontal sync signal in response to the count value reaching a predetermined upper limit value, wherein the logic circuit section is further configured to assert the horizontal sync source signal in response to an assertion of the horizontal sync period start instruction detect signal and an assertion of the pseudo horizontal sync signal, wherein the counter is further configured to be reset to a predetermined reset value in response to the assertion of the horizontal sync period start instruction detect signal, and wherein the counter is further configured so that the count value thereof is set to a predetermined value larger than the reset value in response to the assertion of the pseudo horizontal sync signal.

12. The display driver according to claim 11, wherein the logic circuit section does not assert the horizontal sync source signal when the count value does not reach a predetermined lower limit value.

13. The display driver according to claim 10, wherein the horizontal sync period start instruction detect section is further configured to assert the horizontal sync period start instruction detect signal when detecting the horizontal sync period start instruction, wherein the counter is further configured to count down the count value, wherein the pseudo horizontal sync signal generator section is further configured to assert the pseudo horizontal sync signal in response to the count value reaching a predetermined lower limit value, wherein the logic circuit section is further configured to assert the horizontal sync source signal in response to an assertion of the horizontal sync period start instruction detect signal and an assertion of the pseudo horizontal sync signal, wherein the counter is further configured to be reset to a predetermined reset value in response to the assertion of the horizontal sync period start instruction detect signal, and wherein the counter is further configured so that the count value thereof is set to a predetermined value smaller than the reset value in response to the assertion of the pseudo horizontal sync signal.

14. The display driver according to claim 13, wherein the logic circuit section does not assert the horizontal sync source signal when the count value does not reach a predetermined upper limit value.

15. The display driver according to claim 10, wherein the horizontal sync period start instruction includes a horizontal sync packet supplied to the display driver.

16. A display device, comprising:
  a display driver; and
  a display panel,
  wherein the display driver includes:
  a sync extraction circuit configured to:
    generate a vertical sync source signal in response to a vertical sync period start instruction indicating a start of a vertical sync period a horizontal sync source signal in response to a horizontal sync period start instruction indicating a start of a horizontal sync period, the vertical sync period start instruction and the horizontal sync period start instruction being supplied from outside of the display driver;
    assert the vertical sync source signal when detecting the vertical sync period start instruction, and when a first predetermined period of time has passed after a previous assertion of the vertical sync source signal; and
    assert the horizontal sync source signal when detecting the horizontal sync period start instruction, and when a second predetermined period of time has passed after a previous assertion of the horizontal sync source signal;
  a timing generator configured to:
    generate an internal vertical sync signal in response to the vertical sync source signal and an internal horizontal sync signal in response to the horizontal sync source signal; and
    assert the internal vertical sync signal in response to an assertion of the vertical sync source signal and the internal horizontal sync signal in response to an assertion of the horizontal sync source signal; and
  a drive circuit configured to:
    drive the display panel in synchronization with the internal vertical sync signal and the internal horizontal sync signal.

* * * * *